Patented Mar. 21, 1939

2,150,920

UNITED STATES PATENT OFFICE 2,150,920

PREPARATION OF TERTIARY ALKYL PHENOLS

Mortimer T. Harvey, East Orange, N. J., assignor to The Harvel Corporation, a corporation of New Jersey No Drawing. Application May 23, 1935,
Serial No. 23,022

13 Claims. (Cl. 260—624)

The present invention relates to a method of reacting phenol ($C_6H_5OH$) or ortho-cresol or material containing either or both with tertiary alkyl alcohols, with the aid of sulfuric acid as a catalyst, to produce the corresponding substituted phenol. The present invention also relates to methods of reacting tertiary alkyl alcohols with either phenol ($C_6H_5OH$) or ortho-cresol or both, in contact with concentrated sulphuric acid, to produce a high yield of material which will react with the methylene group to make oil soluble, fusible resinous products, with little or no formation of sulphonation products. Beside substituted phenols, the corresponding alkyl ethers of $C_6H_5OH$ and of ortho-cresol can be formed and these react with the methylene group to form oil soluble, fusible resinous products. The reaction in contact with sulphuric acid is exothermic and tends to the formation of sulphonation products but this can be entirely prevented or limited to the negligible degree by keeping the temperature down as by cooling. If the temperature is kept down to 0° C. there will be a high yield of the ethers mentioned above, but I have discovered that excessive cooling is not necessary to get a very high yield of substituted phenol or total substituted phenol and aralkyl ether either of which alone or both of which together will react with a methylene group agent to give oil soluble, fusible resinous condensation products. This high yield is in the neighborhood of ninety per cent of the theoretical and in some cases as high as ninety-five percent of theoretical yield, the amount of sulphonated products is negligible or nothing at all and the amount of unreacted starting material is very low. The difference between theoretical and actual yield are not much more than the losses experienced in the various handlings of the materials such as usually occur in separations and washings and so on.

Heretofore the methods used for making substituted phenols have produced comparatively small yields or else complicated methods have been resorted to as in the Patent No. 1,948,287 to Buc and Schuler I have discovered that if either phenol, $C_6H_5OH$, or ortho-cresol or a mixture of the two is reacted with a tertiary alcohol in contact with concentrated sulphuric acid at a temperature between 10° C and 25° C. a yield of over eighty per cent in the corresponding substituted phenol can be produced. Sulphonated reaction products usually are not produced or if produced are in negligible and almost undetectable traces and in such small quantities as can be disregarded in most commercial uses.

Examples of the tertiary alcohols which will react according to the present invention are tertiary butyl alcohol, tertiary amyl alcohol, the tertiary hexyl alcohols, and the higher tertiary homologues.

The reaction results of the present invention will take place in the presence of other phenolic compounds such as meta and para cresols or the xylenols and under the reaction conditions of the present invention such phenolic compounds as meta and para cresols and the xylenols will not be sulphonated but will react to a small extent to form the tertiary alkyl ethers and the substituted phenols. In some cases such reaction products are present only as traces, and sulphonated products are entirely absent or present only in negligible amounts.

In addition to the substituted phenols, small quantities of the corresponding alkyl phenyl ether are produced with the method of the present invention but for some uses these can be left with the substituted phenols, not as impurities but for the same purpose or use as the substituted phenols, for example, such products obtained by the method of the present invention are useful particularly in making condensation products of the phenol-formaldehyde type which will range from syrupy condensates to hard resins depending on the materials used, whether phenol, ortho-cresol or mixtures of both together or of either or both with the other cresols and with xylenols and other phenolic compounds and depending on the time and temperature used for the condensation reaction.

As examples of methods and proportions of materials used in the practice of the present invention the following are given. In each case the phenolic compound and the tertiary alkyl alcohol are mixed together and the concentrated sulphuric acid added slowly with the temperature being kept in the range indicated.

Example 1

A commercial cresol fraction comprising substantially thirty parts by weight of phenol, fifty parts of ortho-cresol and twenty parts of meta para cresol was reacted with about a molecular proportion of tertiary butyl alcohol at about 15° C. to 20° C. with the aid of concentrated sulphuric acid which was added drop by drop with constant stirring until a milkiness showed which indicated the separation of sulphuric acid which was diluted with water produced by the reaction.

The reaction products were left to stand to separate them from the sulphuric acid solution which was taken off after which the reaction products were washed several times with water. The washed product comprised about twenty per cent tertiary butyl ethers and eighty per cent substituted tertiary butyl phenol. The final yield in a representative run was about ninety per cent of the theoretical yield, the washing taking away any soluble unreacted phenols and any soluble substituted phenols and any sulphonated products.

*Example 2*

A commercial cresol fraction containing about eighty-five per cent ortho cresol and the balance substantially all phenol and meta para cresol mixed with about molecular proportion of tertiary butyl alcohol and treated with concentrated sulphuric acid at about 15° C. to 20° C. gave a final product which was about twenty-seven per cent ethers and about seventy-three per cent of the substituted phenols.

*Example 3*

With a mixture of thirty parts of phenol, $C_6H_5OH$; fifty parts of ortho cresol and twenty parts of meta and para cresol; a molecular proportion of tertiary butyl alcohol for all of the phenols present and 25 c. c. of concentrated sulphuric acid per gram mol formula of each of the phenols reacted at 15° C. to 25° C. the yield was about 85 per cent para substituted tertiary butyl phenols and about 15 per cent of ethers, giving ninety-five per cent of the theoretical yield.

*Example 4*

110 grams $C_6H_5OH$; 70 grams tertiary amyl alcohol; 100 c. c. concentrated sulphuric acid. Temperature 5° to 15° C. Yield: substantially all para tertiary amyl phenol and a small amount of tertiary amyl phenyl ether, and over ninety-five per cent of the theoretical yield.

The amount of phenyl alkyl ethers produced varies with the materials and mixtures of the starting phenols and with the temperature, within the given range, the lower the temperature the greater the amount of ether produced and the higher the temperature the greater is the proportion of substituted phenol produced; and the amount of substituted phenol produced can be increased by increasing the amount of concentrated sulphuric acid, and the concentrated sulphuric acid can be added beyond the point where milkiness begins to show to get increased proportions of substituted phenols without substantial sulphonation if the temperature is kept within the limits set forth. That is, the sulphuric acid can be used in excess of the optimum amount for yielding the maximum amount of substituted phenol without formation of any appreciable amount of sulphonation products if the temperature is kept in the range given, that is, below about 30° C. The term "milkiness" is used herein and in the claims hereof to define the emulsion formed in the mixture by the sulphuric acid when diluted with the water formed by the reaction of the phenol with the alcohol.

The present application is a continuation in part of my copending application Serial Number 716,333, filed March 19, 1934, issued as Patent No. 2,051,765 on August 18, 1936.

Having thus described my invention, what I claim and desire to protect by Letters Patent is:

1. The method of reacting a tertiary alcohol with material selected from the group consisting of phenol ($C_6H_5OH$) and ortho cresol in contact with concentrated sulphuric acid which comprises gradually adding the sulphuric acid to a mixture of the material used while maintaining said mixture in a temperature range between about 10° C. and about 25° C.

2. The method of reacting a tertiary alcohol with material selected from the group consisting of phenol ($C_6H_5OH$) and ortho cresol in contact with concentrated sulphuric acid which comprises gradually adding the sulphuric acid to a mixture of the material used while maintaining said mixture in a temperature range between about 10° C. and about 25° C., the sulphuric acid being added in at least sufficient amount to produce a milkiness in the mixture as said acid is diluted by the water formed by the phenol-alcohol reaction.

3. The method of reacting a tertiary alcohol with material selected from the group consisting of phenol ($C_6H_5OH$) and ortho cresol in contact with concentrated sulphuric acid which comprises gradually adding the sulphuric acid to a mixture of the material used while maintaining said mixture in a temperature range between about 10° C. and about 25° C., the sulphuric acid being added in excess of the amount necessary to produce a milkiness as it is diluted by the water formed by the phenol-alcohol reaction.

4. The method of producing substituted phenols from the reaction of material selected from the group consisting of phenol ($C_6H_5OH$) and orthocresol with a tertiary alkyl alcohol, with the aid of concentrated sulphuric acid, which comprises gradually adding the sulphuric acid to a mixture of the materials selected at a temperature between 10° C. and 25° C.

5. The method of producing the tertiary alkyl phenols from $C_6H_5OH$ and from ortho cresol which comprises mixing the phenol and the tertiary alkyl alcohol corresponding to the desired substituted alkyl phenol and gradually adding concentrated sulphuric acid to the mixture while maintaining the latter at a temperature between 10° C. and 25° C.

6. The method of producing the para tertiary alkyl phenol of phenol ($C_6H_5OH$) and of ortho cresol which comprises mixing a tertiary alcohol with the phenol selected and gradually adding concentrated sulphuric acid at a temperature between 15° C. and 25° C.

7. In the process of producing tertiary alkyl derivatives of phenol ($C_6H_5OH$) and of orthocresol with the aid of sulphuric acid, the step which consists in adding the sulphuric acid in small increments to the phenolic compound at a temperature between 10° C. and 25° C.

8. The method of producing substituted phenols from the reaction of material selected from the group consisting of phenol ($C_6H_5OH$) and ortho cresol with a tertiary alcohol, with the aid of concentrated sulphuric acid, which comprises gradually adding the sulphuric acid to a mixture of the materials selected while maintaining the temperature between about 10° C. and about 25° C. and continuing the addition of the sulphuric acid at least until the sulphuric begins separating from the phenolic materials in a milky emulsion with the water formed by the reaction.

9. The method of producing substituted phenols from the reaction of material selected from the group consisting of phenol ($C_6H_5OH$) and ortho cresol with a tertiary butyl alcohol, with the aid of concentrated sulphuric acid which comprises gradually adding the sulphuric acid to a mixture of the materials selected while maintaining the temperature between about 10° C. and about 25° C. and continuing the addition of the sulphuric acid at least until the sulphuric begins separating from the phenolic materials in a milky emulsion with the water formed by the reaction.

10. The method of producing the para tertiary alkyl phenol of phenol ($C_6H_5OH$) which comprises mixing a tertiary alcohol with phenol ($C_6H_5OH$) and gradually adding concentrated sulphuric acid at a temperature between 15° C. and 25° C.

11. The method of producing the para tertiary phenol of ortho cresol which comprises mixing a tertiary alcohol with ortho cresol and gradually adding concentrated sulphuric acid at a temperature between 15° C. and 25° C.

12. The method of producing the para tertiary alkyl phenol of phenol ($C_6H_5OH$) and of ortho cresol which comprises mixing a tertiary alcohol with the phenol selected and gradually adding concentrated sulphuric acid at a temperature between 15° C. and 25° C., the sulphuric acid being added in amount between that which produces a milkiness in the reaction mixture and about one molecular equivalent with respect to the reagent materials.

13. The method of producing the para tertiary alkyl phenol of phenol ($C_6H_5OH$) and of ortho cresol which comprises mixing a tertiary alcohol with the phenol selected and gradually adding concentrated sulphuric acid thereto, the temperature of the reaction mixture being maintained between 15° C. and 25° C. while the sulphuric acid is being added until a milkiness appears in the reaction mixture.

MORTIMER T. HARVEY.